(12) United States Patent
Zhong et al.

(10) Patent No.: US 10,345,650 B2
(45) Date of Patent: Jul. 9, 2019

(54) LIQUID CRYSTAL DISPLAY DEVICE, AND MOTHERBOARD OF LIQUID CRYSTAL DISPLAY PANEL AND METHOD FOR MANUFACTURING THE SAME

(71) Applicant: Shenzhen China Star Optoelectronics Technology Co., Ltd., Shenzhen, Guangdong (CN)

(72) Inventors: Xiaohua Zhong, Guangdong (CN); Zhiyuan Shen, Guangdong (CN); Tao Song, Guangdong (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 124 days.

(21) Appl. No.: 14/417,827

(22) PCT Filed: Jan. 13, 2015

(86) PCT No.: PCT/CN2015/070586
§ 371 (c)(1),
(2) Date: May 6, 2016

(87) PCT Pub. No.: WO2016/106839
PCT Pub. Date: Jul. 7, 2016

(65) Prior Publication Data
US 2016/0246087 A1    Aug. 25, 2016

(30) Foreign Application Priority Data
Dec. 31, 2014 (CN) .......................... 2014 1 0855322

(51) Int. Cl.
*G02F 1/1339* (2006.01)
*G02F 1/1333* (2006.01)
(Continued)

(52) U.S. Cl.
CPC .......... *G02F 1/1339* (2013.01); *G02F 1/1341* (2013.01); *G02F 1/133351* (2013.01);
(Continued)

(58) Field of Classification Search
CPC ............. G02F 1/1339; G02F 1/133351; G02F 1/133788; G02F 1/1341; G02F 2001/13415; G02F 2001/133354; G02F 2202/28
See application file for complete search history.

(56) References Cited

U.S. PATENT DOCUMENTS 8,237,908 B2    8/2012 Seok
2011/0104975 A1*    5/2011 Yamagishi ............ C03B 33/076
                                                            445/25
2013/0128201 A1*    5/2013 Noma ................ G02F 1/133753
                                                            349/123

FOREIGN PATENT DOCUMENTS

CN    101498853 A    8/2009
CN    102067017 A    5/2011
(Continued)

OTHER PUBLICATIONS

International Search Report and Written Opinion, dated Jan. 13, 2015, China.

*Primary Examiner* — Angela K Davison
(74) *Attorney, Agent, or Firm* — Andrew C. Cheng (57) ABSTRACT

Related to is a liquid crystal display device, a motherboard of liquid crystal display panels, and a method for preparing the motherboard of liquid crystal display panels. The motherboard of liquid crystal display panels is manufactured by the following steps: providing a first substrate motherboard; providing a second substrate motherboard; forming a plurality of frame glue patterns on the first substrate motherboard or the second substrate motherboard, each of the plurality of frame glue patterns including a first frame, a
(Continued)

second frame, and a third frame, wherein the second frame and the third frame have a same width which is twice a width of the first frame; dripping liquid crystals into the plurality of frame glue patterns; and aligning the first substrate motherboard with the second substrate motherboard, and gluing them together through the plurality of frame glue patterns. The motherboard of liquid crystal display panels manufactured through such a method has high utilization.

5 Claims, 5 Drawing Sheets

(51) Int. Cl.
  *G02F 1/1337* (2006.01)
  *G02F 1/1341* (2006.01)
(52) U.S. Cl.
  CPC .............. *G02F 1/133788* (2013.01); *G02F 2001/13415* (2013.01); *G02F 2202/28* (2013.01)

(56) References Cited

FOREIGN PATENT DOCUMENTS

| | | |
|---|---|---|
| CN | 103207480 A | 7/2013 |
| CN | 103838024 A | 6/2014 |
| JP | 2010128454 A | 6/2010 |

\* cited by examiner

Fig. 1

(Prior Art)

Fig. 2

(Prior Art)

Fig. 3

(Prior Art)

LIQUID CRYSTAL DISPLAY DEVICE, AND MOTHERBOARD OF LIQUID CRYSTAL DISPLAY PANEL AND METHOD FOR MANUFACTURING THE SAME

CROSS-REFERENCE TO RELATED APPLICATIONS

The present application claims benefit of Chinese patent application CN 201410855322.4, entitled "Liquid crystal display device, and motherboard of liquid crystal display panel and method for manufacturing the same" and filed on Dec. 31, 2014, the entirety of which is incorporated herein by reference.

FIELD OF THE INVENTION

The present disclosure relates to the field of liquid crystal displays, and in particular, to a liquid crystal display device, and a motherboard of liquid crystal display panels, and a method for manufacturing the motherboard of liquid crystal display panels.

BACKGROUND OF THE INVENTION

Figure 1:
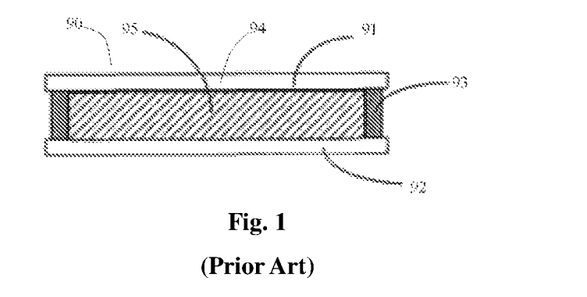
FIG. 1 shows the structure of an existing motherboard of liquid crystal display panels.

FIG. 1 shows a motherboard 90 of liquid crystal display panels, comprising a first substrate motherboard 91, an opposite second substrate motherboard 92, liquid crystals 95 disposed between the first substrate motherboard 91 and the second substrate motherboard 92, and frame glue 93 for gluing the first substrate motherboard 91 to the second substrate motherboard 92.

The motherboard 90 of liquid crystal display panels can be typically manufactured through the following steps: 1) providing the first substrate motherboard 91, and coating the first substrate motherboard 91 with the frame glue 93 thereon, wherein the frame glue 93 defines a plurality of enclosed regions for a plurality of liquid crystal display panels 94; 2) pouring the liquid crystals 95 into the plurality of enclosed regions for the plurality of liquid crystal display panels 94 defined with the frame glue 93; and 3) providing the second substrate motherboard 92, which is to be glued to the first substrate motherboard 91 by means of the frame glue 93. While a liquid crystal display device (not shown in the drawing) is being manufactured, a cutting procedure will be employed to divide the motherboard 90 of liquid crystal display panels into the plurality of liquid crystal display panels 94.

Figure 2:
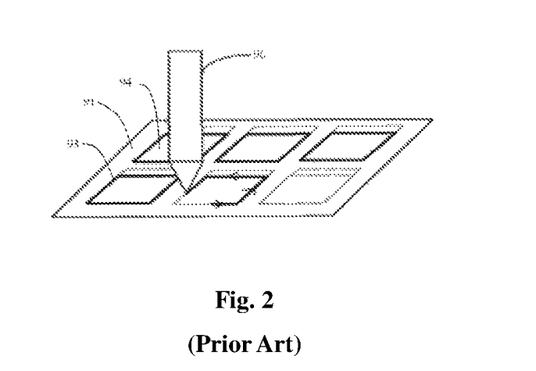
FIG. 2 shows an existing method for coating a frame with glue.

In the prior art, the first substrate motherboard 91 is coated with the frame glue 93 generally through a method as shown in FIG. 2. As FIG. 2 indicates, starting from one point at an edge of one of the plurality of liquid crystal display panels 94, a glue injector 96 moves, in a clockwise or anticlockwise direction, circumferentially along all edges of said liquid crystal display panel 94, and finally returns to the starting point, such that said liquid crystal display panel 94 is completely coated with the frame glue 93. Subsequently, the glue injector 96 is shifted to a starting point of a next one of the plurality of liquid crystal display panels 94 to be coated with the frame glue 93, and the above operation is repeated to complete coating of said next one of the plurality of liquid crystal display panels 94 with the frame glue 93. As such, all of the plurality of liquid crystal display panels 94 can be coated with the frame glue 93.

Figure 3:
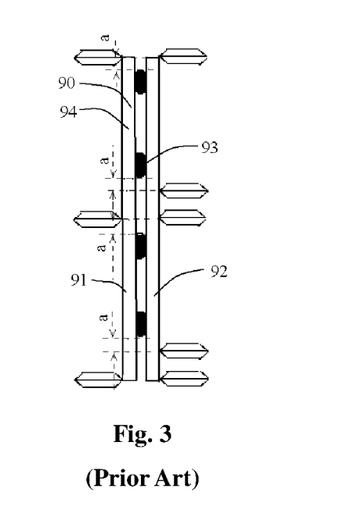
FIG. 3 schematically shows cutting the existing motherboard of liquid crystal display panels.

However, as shown in FIG. 3, while the plurality of liquid crystal display panels 94 are being arranged on the motherboard 90 of liquid crystal display panels, it is necessary to provide a vacant area a for cutting inaccuracy between two adjacent frame glues 93. Such an arrangement renders utilization of the first substrate motherboard 91 and the second substrate motherboard 92 low.

SUMMARY OF THE INVENTION

Directed against the above technical problem existing in the prior art, the present disclosure provides a liquid crystal display device, a motherboard of liquid crystal display panels, and a method for preparing the motherboard of liquid crystal display panels. Display panels can be optimally distributed on the motherboard of liquid crystal display panels, thus reducing the vacant area for cutting inaccuracy and improving utilization of the motherboard of liquid crystal display panels.

According to a first aspect of the present disclosure, a method for manufacturing a motherboard of liquid crystal display panels is provided, comprising the following steps:

step I): providing a first substrate motherboard, on which a plurality of first display side plates, which is arranged in form of a matrix, is distributed, wherein the first display side plates located in one and a same row each have their own terminals placed on a same side of said first display side plates;

step II): providing a second substrate motherboard, and arranging a plurality of second display side plates thereon to form a plurality of display panels with the plurality of first display side plates;

step III): forming a plurality of frame glue patterns on the first substrate motherboard or the second substrate motherboard, each of the plurality of frame glue patterns including a first frame arranged on a side of a corresponding display panel where the terminal is located, a second frame arranged on an opposite side of the corresponding display panel, and a third frame arranged at two ends of the corresponding display panel and capable of being connected to the first frame and the second frame, wherein the third frames of two adjacent display panels coincide with each other, and the second frame and the third frame have a same width which is twice a width of the first frame;

step IV): dripping liquid crystals into the plurality of frame glue patterns; and step V): aligning the first substrate motherboard with the second substrate motherboard, and gluing them together through the plurality of frame glue patterns.

In one embodiment, in step I), the first substrate motherboard is provided with at least two rows of the first display side plates thereon, in such a manner that the first display side plates located in an $N^{th}$ row and the terminals associated therewith are respectively arranged in symmetry with the first display side plates located in an $(N-1)^{th}$ row and the terminals associated therewith. And in step III), the second frames associated with the display panels located in the $N^{th}$ row respectively coincide with the second frames associated with the display panels located in the $(N-1)^{th}$ row. N is an even number no smaller than 2.

In one embodiment, in step I), the first substrate motherboard is provided with at least three rows of the first display side plates thereon in such a manner that the terminals associated with the first display side plates located in an $(N+1)^{th}$ row are adjacent to corresponding terminals associated with the first display side plates located in the $N^{th}$ row.

In one embodiment, in two rows of display panels symmetrically arranged with each other, the first frames located in one and a same straight line, the second frames located in one and a same straight line, and the third frames located in one and a same straight line are all formed through continuous coating with frame glue at a time, respectively.

In one embodiment, before step III), a groove is arranged at each of a plurality of intersections formed between and among the first frames, the second frames, and the third frames that are corresponding to the plurality of frame glue patterns, the groove being arranged on the first substrate motherboard.

In one embodiment, polarized ultraviolet light is used to align an alignment layer arranged on the first substrate motherboard in step I), and to align an alignment layer arranged on the second substrate motherboard in step II); or to align the liquid crystals of the motherboard of liquid crystal display panels after step V), wherein in each alignment step as described above, a non-alignment area is shielded as per a requirement of a viewing angle of each of the display panels.

According to a second aspect of the present disclosure, a motherboard of liquid crystal display panels is provided, comprising:

a first substrate motherboard, which is distributed with a plurality of first display side plates forming a matrix, wherein the first display side plates located in one and a same row each have their own terminals placed on a same side of said first display side plates;

a second substrate motherboard, which is provided with a plurality of second display side plates thereon capable of forming a plurality of display panels with the plurality of first display side plates;

a plurality of frame glue patterns arranged on the first substrate motherboard or the second substrate motherboard, each of the plurality of frame glue patterns including a first frame arranged on a side of a corresponding display panel where the terminal is located, a second frame arranged on another side of the corresponding display panel, and a third frame arranged at two ends of the corresponding display panel and capable of being connected to the first frame and the second frame, wherein the third frames of two adjacent display panels coincide with each other, and the second frame and the third frame have a same width which is twice a width of the first frame; and liquid crystals filled in the plurality of frame glue patterns.

In one embodiment, the first substrate motherboard is provided with at least two rows of the first display side plates thereon in such a manner that the first display side plates located in an $N^{th}$ row and the terminals associated therewith are respectively arranged in symmetry with the first display side plates located in an $(N-1)^{th}$ row and the terminals associated therewith. And on the first substrate motherboard, the second frames associated with the display panels located in the $N^{th}$ row respectively coincide with the second frames associated with the display panels located in the $(N-1)^{th}$ row. N is an even number no smaller than 2.

In one embodiment, the first substrate motherboard is provided with at least three rows of the first display side plates thereon in such a manner that the terminals associated with the first display side plates located in an $(N+1)^{th}$ row are adjacent to corresponding terminals associated with the first display side plates located in the $N^{th}$ row.

According to a third aspect of the present disclosure, a liquid crystal display device is provided, comprising a liquid crystal display screen obtained through cutting the motherboard of liquid crystal display panels as described above along the frame glue patterns thereof, wherein said cutting is performed along midlines of the second frames and the third frames.

Compared with the prior art, the present disclosure has the following advantages. The frame glue patterns on the motherboard of liquid crystal display panels manufactured through the method of the present disclosure is arranged in such a manner that the second frames and the third frames have the same width which is twice the width of the first frames. This renders it possible to cut the motherboard of liquid crystal display panels along the midlines of the second frames and the third frames thereof, in a subsequent manufacturing step of the liquid crystal display device. As a result, according to the method for manufacturing the motherboard of liquid crystal display panels, a vacant area for cutting inaccuracy provided between two adjacent display panels in the prior art can be reduced, thereby improving a utilization rate of the motherboard of liquid crystal display panels. Meanwhile, as the motherboard of liquid crystal display panels can be cut along the midlines of the second frames and the third frames, the widths of the frames can be rather readily reduced, thereby achieving a narrow-framed display panel.

BRIEF DESCRIPTION OF THE DRAWINGS

In the following, preferred embodiments of the present disclosure will be illustrated in detail in connection with accompanying drawings, in which.

In the drawings, the same components are indicated with the same reference signs. The figures are not drawn in accordance with an actual scale.

DETAILED DESCRIPTION OF THE EMBODIMENTS

The present disclosure will be further explained in conjunction with the accompanying drawings.

Figure 4:
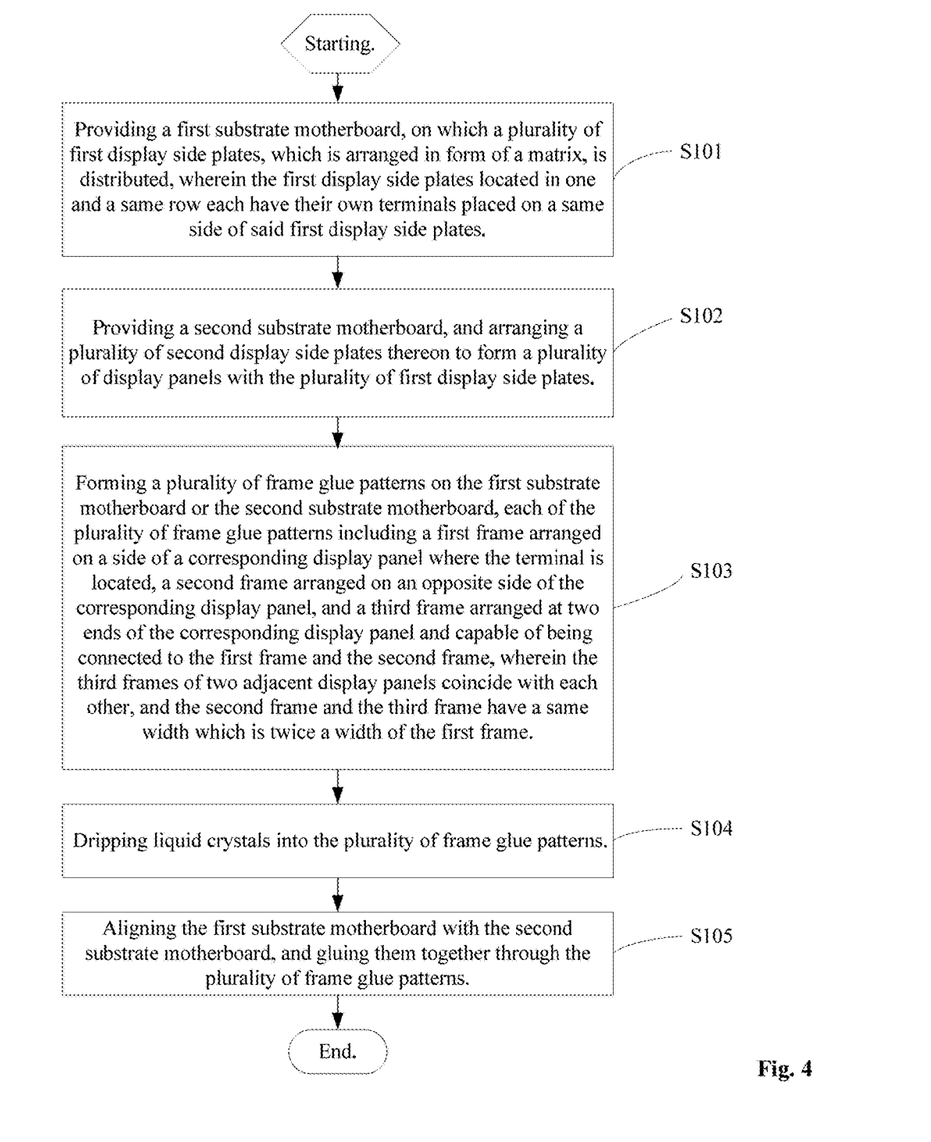
FIG. 4 shows a flow chart for manufacturing a motherboard of liquid crystal display panels according to the present disclosure.

FIG. 4 shows a flow chart for manufacturing a motherboard 100 of liquid crystal display panels according to the present disclosure. In the following, a method for manufacturing the motherboard 100 of liquid crystal display panels will be explained in detail in view of FIG. 4 and meanwhile with reference to FIGS. 5-7. The method comprises the following steps.

In step S101, a first substrate motherboard 1 is provided, and a plurality of first display side plates 11, which is distributed in form of a matrix, is arranged on the first substrate motherboard 1. The first display side plates 11 located in one and a same row each have their own terminals 12 placed on a same side of said first display side plates 11.

In step S102, a second substrate motherboard 2 is provided, and a plurality of second display side plates 21 is arranged on the second substrate motherboard 2, to form a plurality of display panels 6 with the plurality of first display side plates 11.

In step S103, a plurality of frame glue patterns 3 is formed on the first substrate motherboard 1 or the second substrate motherboard 2. Each of the plurality of frame glue patterns 3 comprises a first frame 31 arranged on a side of a corresponding display panel 6 where the terminal 12 is located, a second frame 32 arranged on an opposite side of the corresponding display panel 6, and a third frame 33 arranged at two ends of the corresponding display panel 6 and capable of being connected to the first frame 31 and the second frame 32, wherein the third frames 33 of two adjacent display panels coincide with each other, and the second frame 32 and the third frame 33 have a same width which is twice a width of the first frame 31.

In step S104, liquid crystals 5 are dripped into the plurality of frame glue patterns 3.

In step S105, the first substrate motherboard 1 is aligned with and glued to the second substrate motherboard 2 through the plurality of frame glue patterns 3.

In the motherboard 100 of liquid crystal display panels manufactured through such a method, the plurality of display panels 6 will be compactly distributed on the motherboard 100 of liquid crystal display panels, and two adjacent display panels 6 located in one and a same row can be provided with one strip of the third frame 33 therebetween only. Thus, the motherboard 100 of liquid crystal display panels can be cut along a midline of the third frame 33. As a result, it will be unnecessary to provide a vacant area for cutting inaccuracy between the two adjacent display panels 6, and only a vacant area b for cutting inaccuracy will be necessary to be provided at the first frame 31. Meanwhile, since the motherboard 100 of liquid crystal display panels can be cut along a midline of the second frame 32 and that of the third frame 33, it will be rather easy for the display panel 6 to have a narrower frame, thereby achieving a narrow-framed display panel. As such, the above method can be used to enable the motherboard 100 of liquid crystal display panels with a high utilization rate and a narrow frame.

Figure 5:
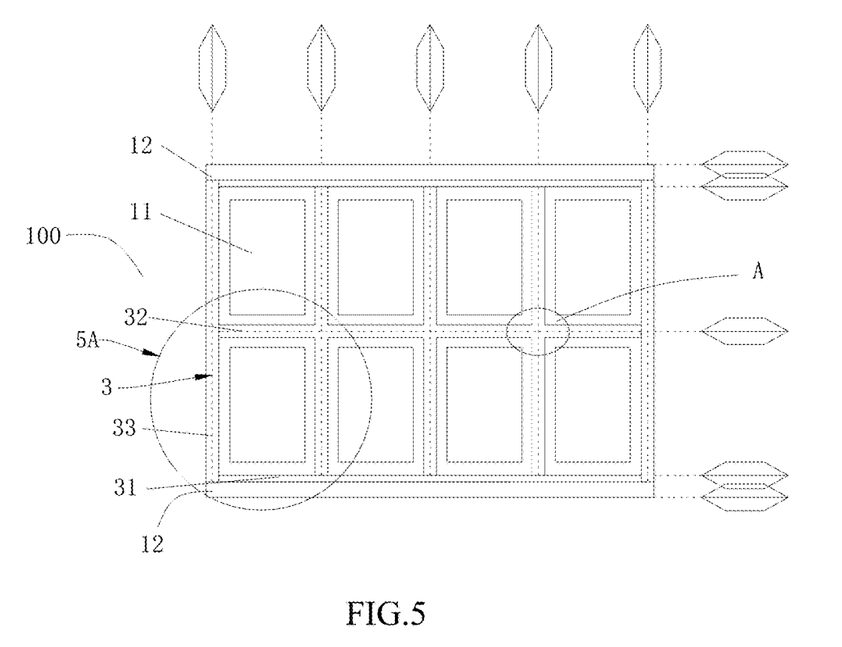
FIG. 5 shows a front view of the motherboard of liquid crystal display panels according to the present disclosure in its cutting state, FIG. 5A being an enlarged view of a circled portion 5A of FIG. 5.
Figure 5A:
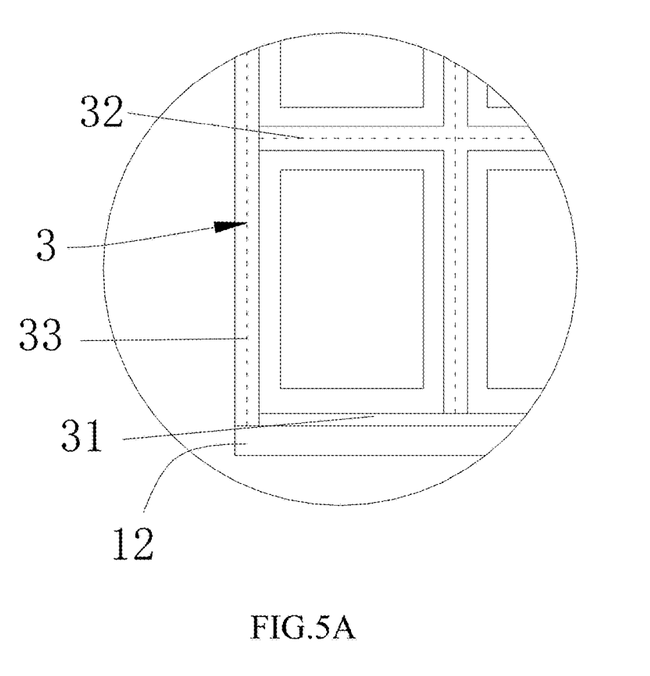

Further, as shown in FIG. 5, the first substrate motherboard 1 can be provided with at least two rows of the first display side plates 11 thereon. In this case, the first display side plates 11 located in an $N^{th}$ row and the terminals 12 associated therewith can be respectively arranged in symmetry with the first display side plates 11 located in an $(N-1)^{th}$ row and the terminals 12 associated therewith, and the second frames 32 associated with the display panels 6 located in the $N^{th}$ row can respectively coincide with the second frames 32 associated with the display panels 6 located in the $(N-1)^{th}$ row, wherein N is an even number no smaller than 2. Specifically, if the motherboard 100 of liquid crystal display panels is provided with two rows of the display panels 6 thereon, the terminals 12 associated with the first display side plates 11 are located at two sides of the motherboard 100 of liquid crystal display panels. Meanwhile, the two rows of display panels 6 are provided with one strip of second frame 32 therebetween. Moreover, the third frames 33 symmetrically arranged with each other are connected to each other to form a straight line. As can be seen, such a method for manufacturing the motherboard 100 of liquid crystal display panels can be favorably used to optimize the distribution of the display panels 6 on the motherboard 100 of liquid crystal display panels, so as to achieve a high utilization rate and narrow-framed display panels 6.

Furthermore, if the first substrate motherboard 1 is provided with at least three rows of the first display side plates 11 thereon, and the terminals 12 associated with the first display side plates 11 located in an $(N+1)^{th}$ row are adjacent to corresponding terminals 12 associated with the first display side plates 11 located in the $N^{th}$ row. That is, if no less than three rows of the display panels 6 are provided on the motherboard 100 of liquid crystal display panels, the display panels 6 will be distributed from one side (e.g., an upper side in FIG. 5) to another side (e.g., a lower side in FIG. 5) in a manner as shown in FIG. 5. The display panels 6 located in the $(N+1)^{th}$ row are arranged in the same way as the display panels 6 located in the $(N-1)^{th}$ row.

According to the present disclosure, the display panels 6 located in the $N^{th}$ row are arranged in symmetry with the display panels 6 located in the $(N-1)^{th}$ row, such that in two rows of the symmetrically arranged display panels 6, the first frames 31 located in one and a same straight line, the second frames 32 located in one and a same straight line, and the third frames 33 located in one and a same straight line can all be formed in an operation of continuous coating of the frame glue patterns 3 at a time, respectively. Through such a coating manner, it will be unnecessary to coat separate enclosed frame glue patterns 3 one by one as being done in the prior art. Instead, the frames located in one and a same straight line and having a same width can be finished coating at a time, thereby improving production efficiency.

Figure 9:
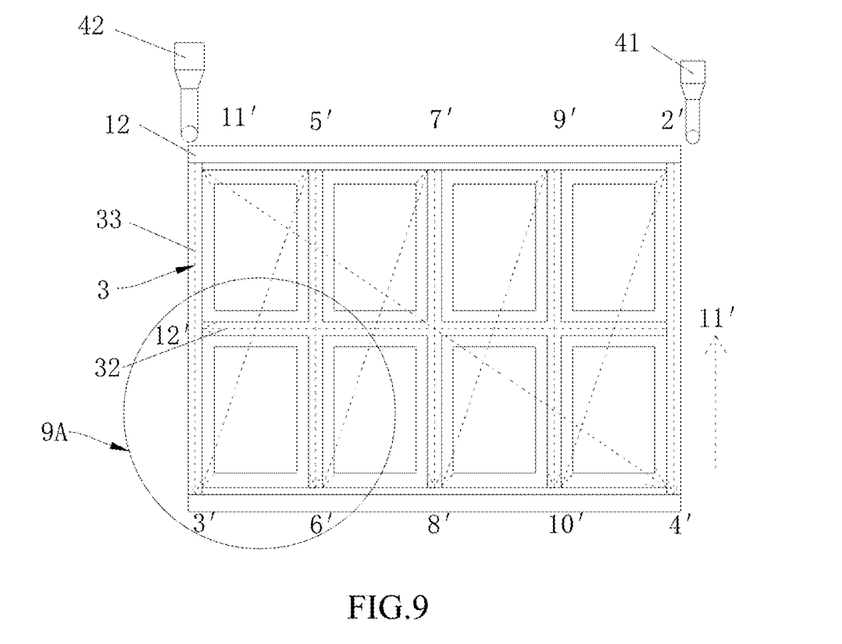
FIG. 9 schematically shows a method for coating a frame with glue according to the present invention, FIG. 9A being an enlarged view of a circled portion 9A of FIG. 9.
Figure 9A:
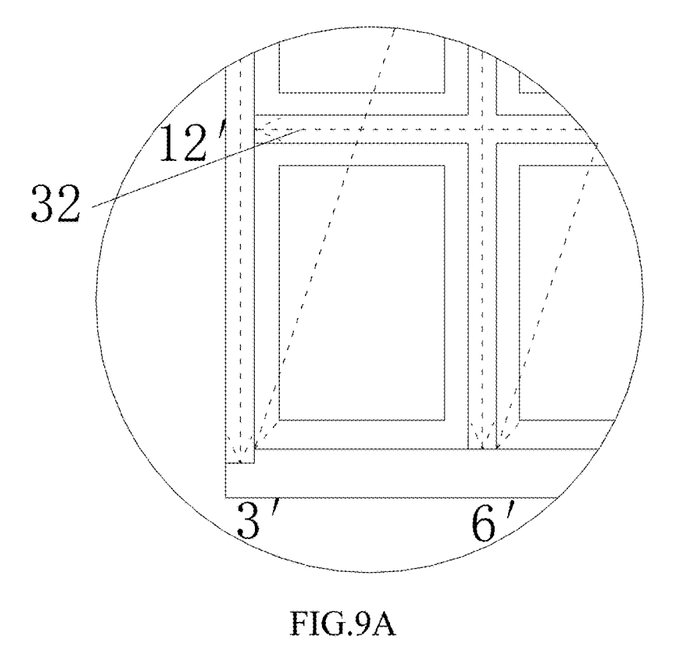

In a specific embodiment as shown in FIG. 9, since the second frames 32 and the third frames 33 have a same width which is twice a width of the first frames 31, two coaters 42 and 41 which are of different diameters can be used to coat the frame glue patterns 3. The diameter of a nozzle of the coater 41 is half the diameter of a nozzle of the coater 42. Specifically, a sub-block of a matrix as shown in FIG. 9 can be referred to as an example. The coater 41 can move from point 2' to point 1' continuously, so as to coat the first frames 31 at a time. Afterwards, the coater 41 can be lifted to a safety height and located at a position corresponding to point 4', followed by being lowered down to a coating height. Finally, the coater 41 can move from point 4' to point 3' continuously, so as to coat another strip of the first frames 31 at a time. On the other hand, the coater 42 can move from point 1' to point 3' continuously, so as to coat a first strip of the third frames 33 at a time. Subsequently, the coater 42 can be shifted and positioned at point 5', and move from point 5' to point 6' continuously, so as to coat a second strip of the third frames 33 at a time. Likewise, the coater 42 can be used to coat a plurality of strips of the third frames 33 successively, each strip of the third frames 33 being located in one and a same straight line formed along corresponding ends of two symmetrically arranged display panels 6. Finally, the coater 42 can be positioned at point 11', and move from point 11' to point 12' continuously, so as to coat the second frames 32 at a time. In such a coating manner, the coaters 41 and 42 take only a few turnings, and therefore move rather fast, thus improving production efficiency. It is important to note that, solid arrows in FIG. 9 indicate moving directions of the coaters 41 and 42 while being used to coat the frames, and dotted arrows thereof indicate moving directions of the coaters 41 and 42 while being positioned. It should be further noted that, movement routes of the coater 41 and 42 are not necessarily limited to those indicated in FIG. 9, and they can also move in other routes. For example, the coater 42 can be arranged to move along the following movement routes similarly: from point 3' to point 1' for coating, from point 1' to point 5' for positioning, and from point 5' to point 6' for coating.

Figure 8:
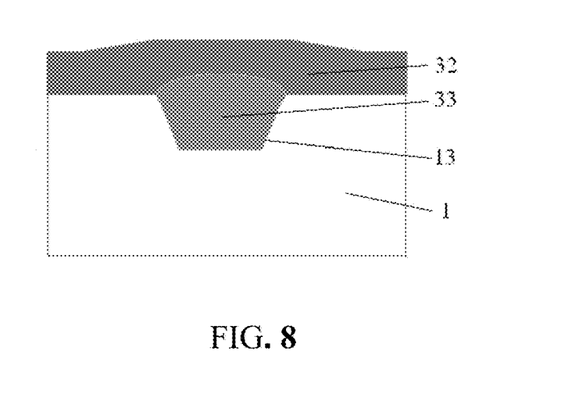
FIG. 8 shows a detail cross-section view of position A from FIG. 5.

According to the present disclosure, in a procedure while a closed frame glue pattern 3 is being formed, the first frame 31, the second frame 32, and the third frame 33 cross each other. Therefore, in order to eliminate a frictioning risk at an intersection during such a procedure, as indicated in FIG. 8, a groove 13 can be arranged at the intersection on the first substrate motherboard 1. Preferably, the groove 13 can be configured as a square groove exposed through a halftone mask or a gray tone mask.

The method for manufacturing the motherboard 100 of liquid crystal display panels can further comprise an optical alignment step, in which, polarized ultraviolet light can be used to align alignment layers arranged on the first substrate motherboard 1 and the second substrate motherboard 2 while they are being provided. Alternatively, the polarized ultraviolet light can be used to align the liquid crystals 5 of the motherboard 100 of liquid crystal display panels after the first substrate motherboard 1 and the second substrate motherboard 2 are glued together. It should be noted that, in the above alignment step, a non-alignment area should be shielded as per a requirement of a viewing angle of each of the display panels 6.

Figure 6:
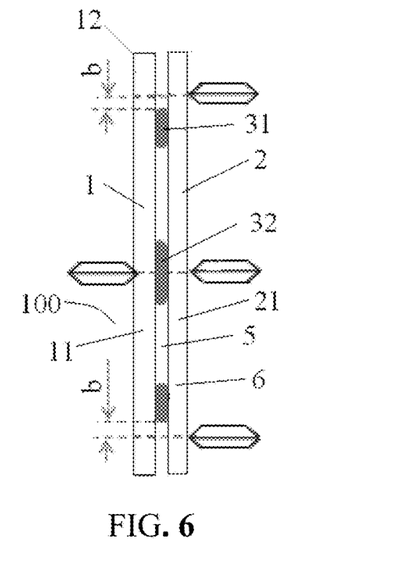
FIG. 6 shows a left view of the motherboard of liquid crystal display panels according to the present disclosure in its cutting state.
Figure 7:
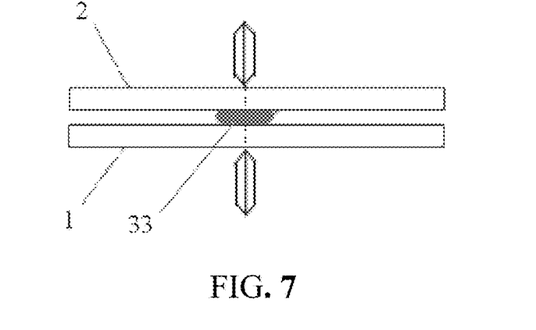
FIG. 7 shows a partial top view of the motherboard of liquid crystal display panels according to the present disclosure in its cutting state.

The present disclosure further provides a motherboard 100 of liquid crystal display panels. As indicated in FIGS. 5-7, the motherboard 100 of liquid crystal display panels can comprise a first substrate motherboard 1, a second substrate motherboard 2, a plurality of frame glue patterns 3, and liquid crystals 5 filled in the plurality of frame glue patterns 3. The first substrate motherboard 1 can be provided with a plurality of first display side plates 11, which is provided in a form of a matrix. The terminals 12 associated with the first display side plates 11 located in one and a same row can be arranged in one and a same side of said first display side plates 11. Accordingly, the second substrate motherboard 2 can be provided with a plurality of second display side plates 21, which is provided in a form of a plurality of display panels 6 with the plurality of first display side plates 11. The plurality of frame glue patterns 3 can be disposed between the first substrate motherboard 1 and the second substrate motherboard 2 for gluing the two together. Each of the plurality of frame glue patterns 3 can include a first frame 31 arranged on a side of a corresponding display panel where the terminal 12 is located, a second frame 32 arranged on another side of the corresponding display panel 6, and a third frame 33 arranged at two ends of the corresponding display panel 6 and capable of being connected to the first frame 31 and the second frame 32. The third frames 33 of two adjacent display panels 6 coincide with each other, and the second frames 32 and the third frames 33 have a same width which is twice a width of the first frames 31. The motherboard 100 of liquid crystal display panels thus arranged can be cut along midlines of the second frames 32 and the third frames 33, so as to form narrow-farmed display panels 6. With the motherboard 100 of liquid crystal display panels thus arranged, it will be unnecessary to provide a vacant area for cutting inaccuracy between two adjacent display panels 6, so as to enable a more compact structure of the display panels 6 on the motherboard 100 of liquid crystal display panels. In addition, the motherboard 100 of liquid crystal display panels having such frame glue patterns 3 is favorable for reduction of production time, thereby improving production efficiency.

If the first substrate motherboard 1 is provided with at least two rows of the first display side plates 11, the first display side plates 11 located in an $N^{th}$ row and the terminals 12 associated therewith can be respectively arranged in symmetry with the first display side plates 11 located in an $(N-1)^{th}$ row and the terminals 12 associated therewith; and on the first substrate motherboard 1, the second frames 32 of the first display side plates 11 located in the $N^{th}$ row can coincide with the second frames 32 of the first display side plates 11 located in the $(N-1)^{th}$ row, wherein N is an even number no smaller than 2. If the first substrate motherboard 1 is provided with at least three rows of the first display side plates 11, the terminals 12 associated with the first display side plates 11 located in an $(N+1)^{th}$ row can be close to corresponding terminals 12 associated with the first display side plates 11 located in the $N^{th}$ row. Thus, the motherboard 100 of liquid crystal display panels will have a more compact typesetting manner thereon, which is beneficial for output of high utilization.

The present disclosure further provides a liquid crystal display device (not shown in the drawings), comprising a liquid crystal display screen (not shown in the drawings). As shown in FIGS. 5-7, the liquid crystal display screen can be obtained through cutting the motherboard 100 of liquid crystal display panels along the frame glue patterns 3 as described above. The cutting can be performed along cutting lines in the drawings (dotted lines corresponding to hexagons in the drawings), and the second frames 32 and the third frames 33 can be cut along midlines thereof.

The above description should not be construed as limitations of the present disclosure, but merely as exemplifications of preferred embodiments thereof. Any variations or replacements that can be readily envisioned by those skilled in the art are intended to be within the scope of the present disclosure. Hence, the scope of the present disclosure should be subject to the scope defined in the claims.

The invention claimed is:

1. A method for manufacturing a motherboard of liquid crystal display panels, comprising the following steps:
    step I): providing a first substrate motherboard, on which a plurality of first display side plates, which is arranged in form of a matrix, is distributed, wherein the first display side plates located in one and a same row each have their own terminals placed on a same side of said first display side plates;
    step II): providing a second substrate motherboard, and arranging a plurality of second display side plates thereon to form a plurality of display panels with the plurality of first display side plates;
    step III): forming a plurality of frame glue patterns on the first substrate motherboard or the second substrate motherboard, each of the plurality of frame glue patterns including a first frame arranged on a side of a corresponding display panel where the terminal is located, a second frame arranged on an opposite side of the corresponding display panel, and a third frame arranged at two ends of the corresponding display panel and capable of being connected to the first frame and the second frame, wherein the third frames of two adjacent display panels coincide with each other, and the second frame and the third frame have a same width which is twice a width of the first frame;
    step IV): dripping liquid crystals into the plurality of frame glue patterns; and step V): aligning the first substrate motherboard with the second substrate motherboard, and gluing them together through the plurality of frame glue patterns;

wherein before step III), a groove is arranged at each of a plurality of intersections formed between and among the first frames, the second frames, and the third frames that are corresponding to the plurality of frame glue patterns, the groove being arranged on the first substrate motherboard.

2. The method for manufacturing a motherboard of liquid crystal display panels according to claim 1, wherein in step I), the first substrate motherboard is provided with at least two rows of the first display side plates thereon in such a manner that the first display side plates located in an $N^{th}$ row and the terminals associated therewith are respectively arranged in symmetry with the first display side plates located in an $(N-1)^{th}$ row and the terminals associated therewith, and wherein in step III), the second frames matched with the display panels located in the $N^{th}$ row respectively coincide with the second frames of the display panels located in the $(N-1)^{th}$ row, and wherein N is an even number no smaller than 2.

3. The method for manufacturing a motherboard of liquid crystal display panels according to claim 2, wherein in step I), the first substrate motherboard is provided with at least three rows of the first display side plates thereon in such a manner that the terminals associated with the first display side plates located in an $(N+1)^{th}$ row are adjacent to corresponding terminals associated with the first display side plates located in the $N^{th}$ row.

4. The method for manufacturing a motherboard of liquid crystal display panels according to claim 3, wherein in two rows of display panels symmetrically arranged with each other, the first frames located in one and a same straight line, the second frames located in one and a same straight line, and the third frames located in one and a same straight line are all formed through continuous coating with frame glue at a time, respectively.

5. The method for manufacturing a motherboard of liquid crystal display panels according to claim 1, wherein polarized ultraviolet light is used to align an alignment layer arranged on the first substrate motherboard in step I), and to align an alignment layer arranged on the second substrate motherboard in step II); or to align the liquid crystals of the bonded motherboard of liquid crystal display panels after step V).

* * * * *